United States Patent [19]

Sugalski et al.

[11] 4,298,662
[45] Nov. 3, 1981

[54] RESEALABLE VENT VALVE FOR CONTAINERS SUCH AS BATTERIES

[75] Inventors: Raymond K. Sugalski; John W. Hooke, both of Gainesville; Paul E. Pate, Branford, all of Fla.

[73] Assignee: General Electric Company, Gainesville, Fla.

[21] Appl. No.: 174,147

[22] Filed: Jul. 31, 1980

[51] Int. Cl.³ .......................................... H01M 10/44
[52] U.S. Cl. ........................................ 429/50; 429/54
[58] Field of Search ............ 429/54, 55, 50; 55/309, 55/310, 385 C, 411, 412, 417; 220/367, 373

[56] References Cited

U.S. PATENT DOCUMENTS

| | | | |
|---|---|---|---|
| 3,293,091 | 12/1966 | Kenney | 149/24 |
| 3,484,301 | 12/1969 | Gray | 136/178 |
| 3,664,878 | 6/1972 | Amthor | 136/178 |
| 4,086,394 | 4/1978 | Tesch | 429/54 |

Primary Examiner—Charles F. Lefevour
Attorney, Agent, or Firm—Morgan, Finnegan, Pine, Foley & Lee

[57] ABSTRACT

This invention pertains to a novel resealable pressure relief vent valve for use in normally sealed containers such as sealed electric batteries or cells wherein said vent valve includes an outer plate having a centrally-raised area, an inner plate having a centrally recessed area, said plates joined at their ends and forming a cavity therebetween, and a compressed resilient elastomeric member interposed in the cavity and positioned to overlie a vent orifice located in the inner plate, whereby during normal operation of the battery or cell the elastomeric member seals the vent orifice and when internal container pressure exceeds a predetermined limit, the elastomeric member distorts, breaking the seal and allowing the venting of the cell.

11 Claims, 8 Drawing Figures

RESEALABLE VENT VALVE FOR CONTAINERS SUCH AS BATTERIES

BACKGROUND OF THE INVENTION (1) Field of the Invention

This invention pertains to a novel resealable pressure relief vent valve which can be used in containers which are air and fluid tight. More particularly, the present invention relates to an improved resealable pressure relief vent valve which is capable of relieving the build-up of excessive gas pressures within a closed container such as an energy cell. When said pressure is relieved, the vent closes providing the cell with its air and fluid-tight configuration.

The values of the present invention have particular application in containers such as electrical batteries or cells which are inexpensive yet which must be provided with a reliable valve which has good endurance to function the entire life of the battery or cell. Therefore, the valves of the present invention are particularly characterized by their relative inexpensive cost of manufacture, simplicity of design and reliability.

The term battery is generally used to describe a single unit comprising one or more cells which supply electrical energy. The electric current is produced directly by chemical reaction which occurs within the battery. The terms battery and cells will be used hereinafter interchangeably.

The resealable vent devices of the present invention are useful in sealed cells in contrast to vented cells. A sealed cell, in its normal operation, does not require the venting of gas to the atmosphere. However, in a vented cell, venting is part of the normal operating behavior of the cell. Although sealed cells contain a vent mechanism, they are still referred to as "sealed" cells because the vent operates only as a safety measure when, as a result of a malfunction or an abuse of the cell, the cell obtains an abnormally high internal pressure.

In a sealed cell, the safety vent mechanism is designed to open if the internal pressure within the cell exceeds a certain limit. It is highly preferred for vent devices in sealed cells or batteries to have a resealing capability. Implicit in this resealing capability is the ability of the vent to repeat the operating cycle of venting and sealing. Therefore, after the vent releases gas to the atmosphere and reduces the excessive internal pressure, the vent automatically closes, resealing the cell but is capable of venting again should the internal pressure build again to exceed the set limit.

The resealing capability of the vent device offers a number of advantages. Resealable vents can be tested prior to assembly into a cell casement to help assure reliable operation. The resealing feature allows the cell to operate after the excess internal pressure has been relieved. Cells containing a non-resealable vent will not function properly after venting because the electrolite within the cell will dry out as the vent remains open.

While the resealable safety vents of the present invention may be utilized in most sealed cells which potentially could experience increases in internal pressure, nickel-cadmium cells are discussed in greatest detail herein. Such cells are merely illustrative and examples of other cells that may be used include carbon-zinc dry cells, lead acid, and "alkaline" cells. The operating pressures for each of these cells and other cells vary from those of nickel-cadmium cells and the resealable vent devices of the present invention may be suitably adapted to be used at pressures other than those in nickel-cadmium cells.

As used herein, the term vent pressure means that internal pressure that will cause the vent in the cell to open.

(2) Description of the Prior Art

Resealable pressure relief vent valves of various designs have been used in the past for releasing high internal gas pressures from the inside of a sealed electrical cell or battery such as a nickel-cadmium cell. These valves generally utilize a valve member such as a flat rubber gasket which is situated in a sealing position over a vent orifice by means of a resilient member such as a helical spring. The resilient member or spring is set to yield at a certain predetermined internal gas pressure which momentarily breaks the seal and allows the gas to escape through the vent orifice. Examples of such pressure relief vent valves are described in U.S. Pat. No. 3,664,878 in the name of H. K. Amthor; U.S. Pat. No. 3,484,301 in the name of E. E. Gray; and U.S. Pat. No. 3,293,091 in the name of J. L. S. Daley. All of these patents disclose devices whose configuration require critical tolerances to enable the valve system to function properly. As brought out in U.S. Pat. No. 3,664,878, a major problem encountered with such valves is that they are bulky and difficult to incorporate into the cell assembly.

Conventional devices utilizing metal springs are extremely costly and require very close tolerances to attain the desired force exerted by the springs. Moreover, the labor costs in fixing the springs in the cell is substantial. The vent device of the present invention has none of these disadvantages attributed to spring-type vents.

The resealable vent device of the present invention overcomes these and other problems and provides numerous additional advantages over known resealable pressure relief valves.

SUMMARY OF THE INVENTION

According to the present invention, there is provided a resealable pressure relief valve capable of relieving the excessive build-up of internal pressure within a closed container by venting gas from the container to the atmosphere and resealing the cell after the internal pressure is sufficiently reduced, said valve comprising:

an outer cover metal plate having a centrally raised area, providing a top hat configuration, an inner metal base plate having a centrally recessed area, said plates joined at their ends and forming a cavity therebetween, and a compressed, resilient, elastomeric member interposed in the cavity between said plates whereby said elastomeric member is positioned to overlie a vent orifice located in the inner base plate, said elastomeric member being compressed to a degree whereby the elastomeric member forms an air-tight seal over the vent orifice when the internal container pressure is less than a predetermined limit, the shape of the elastomeric member being such that either greater compression thereof occurs in the central portion directly above the vent orifice and lesser degree of compression occurs in the peripheral portion of the member or that the shape of said member provides a stress-strain curve of the compressed elastomeric member with respect to the sealing forces over said vent orifice which exhibits a relatively flat region; whereby said elastomeric member is capable of becoming deformed or distorted with respect to the inner base plate and breaking its seal over the vent orifice, when the internal container pressure exceeds a predetermined limit for the container, said break in the seal of the vent orifice in the inner plate forming a passageway for gases to exit from the interior of the container to the atmosphere; and whereby the elastomeric member has sufficient memory to return to its undeformed configuration, resealing the vent orifice, when the internal pressure of the container falls below the predetermined limit.

DESCRIPTION OF THE PREFERRED EMBODIMENTS

The Drawings

Figure 5:
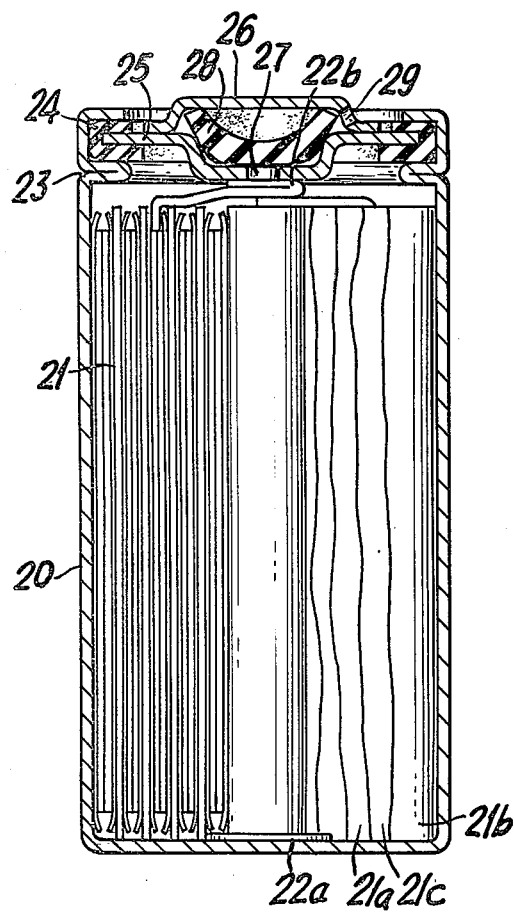
FIG. 5 illustrates another embodiment of the present invention by its fragmentary cross-sectional view of another resealable vent valve in an energy cell where the valve is in a non-venting sealed condition.
Figure 6:
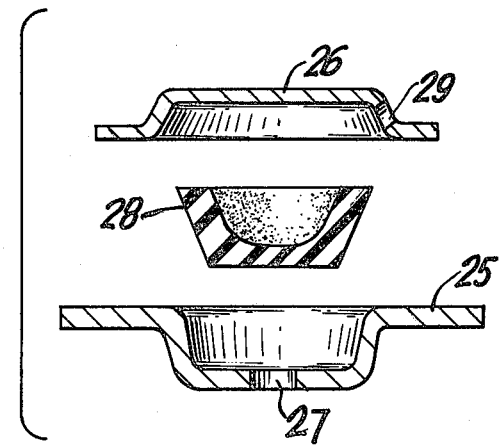
FIG. 6 is an exploded perspective view of the resealable vent valve in the energy cell of FIG. 5.
Figure 7:
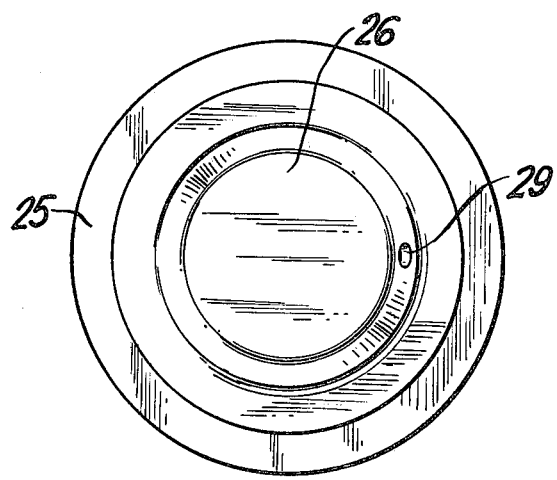
FIG. 7 is a top view of the upper end of the energy cell of FIG. 5.

The drawings illustrate two embodiments of the resealable pressure relief valves of the present invention, FIGS. 1–4 showing the first embodiment and FIGS. 5–7 illustrating the second embodiment.

Figure 1:
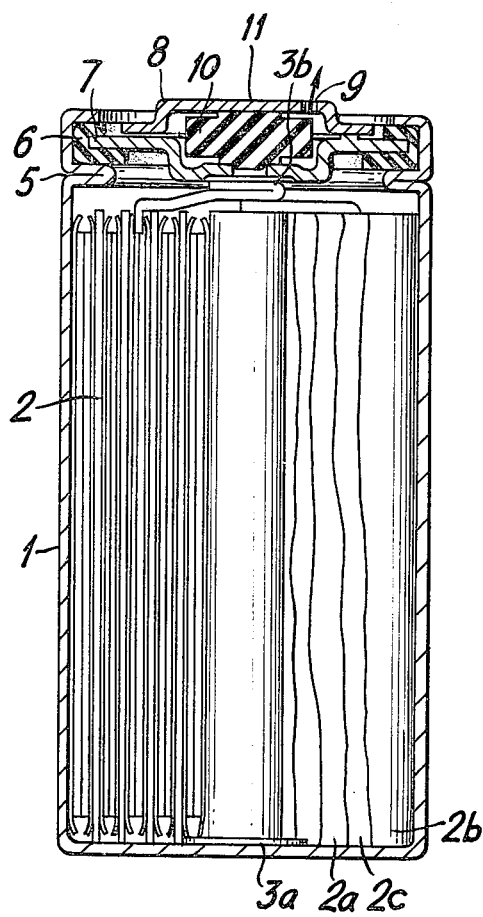
FIG. 1 is a fragmentary cross-sectional view of a resealable vent valve of the present invention in an energy cell where the valve is closed, not in a venting position.
Figure 2:
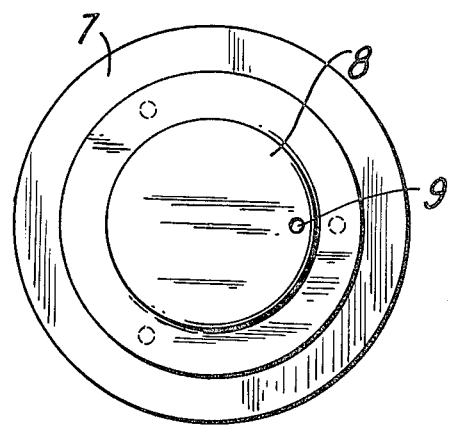
FIG. 2 is a top view of the resealable vent valve in the energy cell of FIG. 1.
Figure 3:
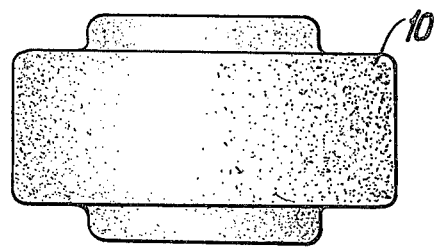
FIG. 3 is a cross-sectional view of an elastomeric member used in the resealable vent valve of FIG. 1.
Figure 4:
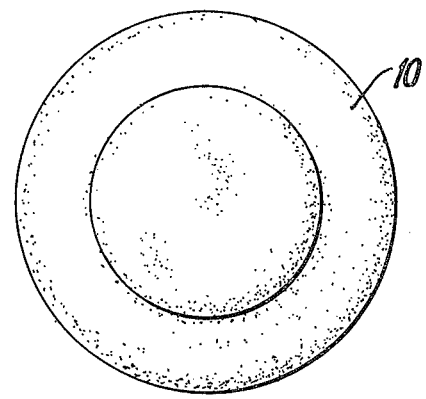
FIG. 4 is a top view of the elastomeric member of FIG. 3 which is used in the resealable vent valve of FIG. 1.

FIGS. 1 and 2 illustrate the cross-section and top views of a battery incorporating a resealable vent valve of the first embodiment. The battery comprises a nickel-plated steel can or casing 1 in which is contained a battery coil 2 which consists of a position plate 2a and a negative plate 2b separated by separator insulative layers 2c which are wound together to form the battery coil 2. A tab 3a connected to or integral with the negative plate 2b is secured to the bottom of the casing 1. Another tab or strap 3b connected to or integral with the positive plate 2a is secured to the inner base plate which is electrically connected to a positive terminal located in the outer cover plate or optionally to an electrically conductive button which can be welded to the top surface of the outer cover plate.

The upper end of the battery is formed by the can 1 being bent forming a groove 5 and rolled or further bent over an insulating seal ring 6 and inner metal plate 7 providing a crimp closure.

The resealable safety vent device of the first embodiment comprises an outer rigid metal plate 8 which contains vent holes 9 to the atmosphere, an inner metal plate 7 containing one or more vent holes 11, and an elastomeric member 10 sandwiched between the outer plate and inner plates.

In the embodiment shown in FIGS. 1–4, the elastomeric member has a greater height in the center than at its extremities, being convex in configuration or shape. In another embodiment (not shown), the elastomeric member can be concave, e.g., a configuration with uniform height but a cross-section length less in the middle than at the top and bottom. The depicted convex configuration is preferred because it is more easily fabricated. The vertical dimensions of the upper and lower plates provide the open cavity area for containing the elastomeric member. The vertical dimensions of each plate are chosen so as to provide the sandwiched elastomeric member with desired compression as will be discussed more fully below. A preferred aspect of the elastomeric member of convex configuration is that it does not require special orientation for its assembly in the vent device.

When the vent pressure is reached, the force upward on the elastomeric member 10 causes it to deform in the area near the vent hole(s) 11 sufficiently to break the seal between the member and the inner plate yielding a vent path outward from the inner container of the cell through vent hole(s) 11 and 9 to the atmosphere. After venting, the internal pressure of the cell is reduced below the vent pressure and the elastomeric member returns to its original configuration, thus resealing the vent hole(s) in the inner plate.

In the second embodiment shown in FIGS. 5–7 of the drawings, the elastomeric member is in the shape of an inverted truncated cone. FIGS. 5 and 7 illustrate the cross-section and top views of a battery incorporating a resealable vent valve of this second embodiment. The battery comprises a nickel-plated steel can or casing 20 in which is contained a battery coil 21 which consists of a positive plate 21a and a negative plate 21b separated by separator insulative layers 21c which are wound together to form the battery coil 21. A tab 22a connected to or integral with the negative plate 21b is secured to the bottom of the casing 20. Another tab or strap 22b connected to or integral with the positive plate 21a is secured to a positive terminal located in the outer rigid metal cover plate 26.

The upper end of the battery is formed by the can 20 being bent forming a groove 23 and rolled or further bent over an insulating seal ring 24 and inner base plate 25 providing a crimp closure.

The resealable safety vent device of the second embodiment comprises an outer rigid metal cover plate 26 having a central protuberance, said plate containing vent holes 29 to the atmosphere, an inner metal base plate 25 of a "U" configuration, the base plate 25 containing one or more vent holes 27, and an elastomeric member 28 sandwiched between the outer plate and inner plates.

In the embodiment shown in FIGS. 5–7, the elastomeric member is conical in shape and in an inverted position with apex downward toward the interior of the cell. The vertical dimensions of the upper and lower plates provide the open cavity area for containing the elastomeric member. The vertical dimensions of each plate are chosen so as to cause the elastomeric member positioned therebetween with desired compression as will be discussed more fully below.

The vent devices of the present invention shown in the drawings are in the sealed condition as would occur during the normal operation of the cells. If the internal pressure increased to exceed the predetermined limit, the venting pressure would be reached causing the elastomeric members 10 and 28 to become distorted upward at the vent holes 9 and 27 resulting in a break in the seal with the base plates 7 and 25. Venting of the cells is thereby achieved as a venting path is formed through holes 9 and 27 of the base plates and through vent holes 11 and 29 in the outer cover plates.

After the internal pressure of the cells is reduced below the vent pressure, the elastomeric members return to their original configuration, thus resealing the vent holes in the inner plate.

The Vent Device And Its Operation

The resealable vent device of the present invention, when incorporated in a sealed nickel-cadmium cell, is designed to open in the pressure range of about 100 to 400 psig. The lower value for the range is determined by the minimum optimum pressure required to carry out the elctrochemical reaction in the cell. The upper value for the range is determined by the maximum internal pressure at which the cell's container will safely maintain its integrity.

The elastomeric member which is sandwiched between the outer metal plate cover and inner metal plate is actually the sealing member which covers the vent hole(s) in the inner plate. Therefore, the material of this member must not be porous to the gases generated within the cell or to the atmosphere.

The elastomeric member must have memory characteristics. The upward force on the member due to internal pressure exceeding the predetermined limit or venting pressure causes the member's lower surface to deflect or distort upward breaking its seal over the vent holes. After gas escapes and internal pressure falls within prescribed safe limits, the member returns to its original configuration, in compressed state forming the seal with the inner plate over the vent holes.

The elastomeric member must also be resistant to caustics and other chemicals within the cell.

The force of compression over the vent hole is the same as the force required to maintain the seal. This force must exceed the force exerted by the normal operating pressure of the cell. The force of compression will be a direct function of the venting pressure selected for the device. A preferred durometer for the composition of the elastomeric device would be such that the desired force of compression of the member against the inner plate is achieved with about a 20% or less compression or reduction in thickness of the member when in position in the cavity. An example of a suitable material for the elastomeric member would be an ethylene-propylene rubber, such as an EPDM Rubber having a durometer of 70±3. Such a rubber is Eaton #117 available from Eaton.

The vertical dimensions for the elastomeric member can be determined from the size of the cavity between the plates, the durometer of the member, and the vent pressure.

According to the present invention, the elastomeric member can have a variety of shapes. In the embodiment depicted in FIGS. 1-4, the elastomeric member is cylindrical with tab-like extensions of smaller dimension at the periphery. The tab-like extension is only required on one side, but is placed on both sides to eliminate the necessity of orienting the member during assembly.

As shown in FIGS. 5-7, in another embodiment of the present invention the elastomeric member can be of a truncated conical shape whereby the member is positioned so that its apex is over the vent hole of the inner plate.

The shape and/or composition of the elastomeric member is an important aspect of the invention. In one embodiment, the elastomeric member relative to the shape of the cavity formed by the outer and inner plates provides an area of greater compression or densification in the central portion directly over the vent hole of the inner plate and a lesser degree of compression over the periphery or other areas of the inner plate. This variation in compression can be accomplished by choosing a particular shape for the member or for the contour of the inner or outer plates. This is illustrated by the elastomeric member shown in FIGS. 1-4.

Alternatively, the shape of the elastomeric member must be such that the stress-strain curve of the elastomeric member with respect to the sealing forces should have a flat region. This is achieved with the truncated cone embodiment of FIGS. 5-7. The flat region means that the force exerted by the compressed elastomeric member against the inner plate is less influenced by variations in the compressed dimensions or degree of compression of the member. This is important because there is generally a wide tolerance in the specifications for the manufacture and assembly of the parts comprising the upper portion of a battery. The degree of compression can vary significantly from one device to another as it depends upon the manufacturing tolerances of the upper and lower plates which define the cavity dimensions. Therefore, for the vent to operate at the proper venting pressure, the force of compression which seals the vent must remain relatively uniform from device-to-device despite variations in the dimensions of the elastomeric member and cavity.

Figure 8:
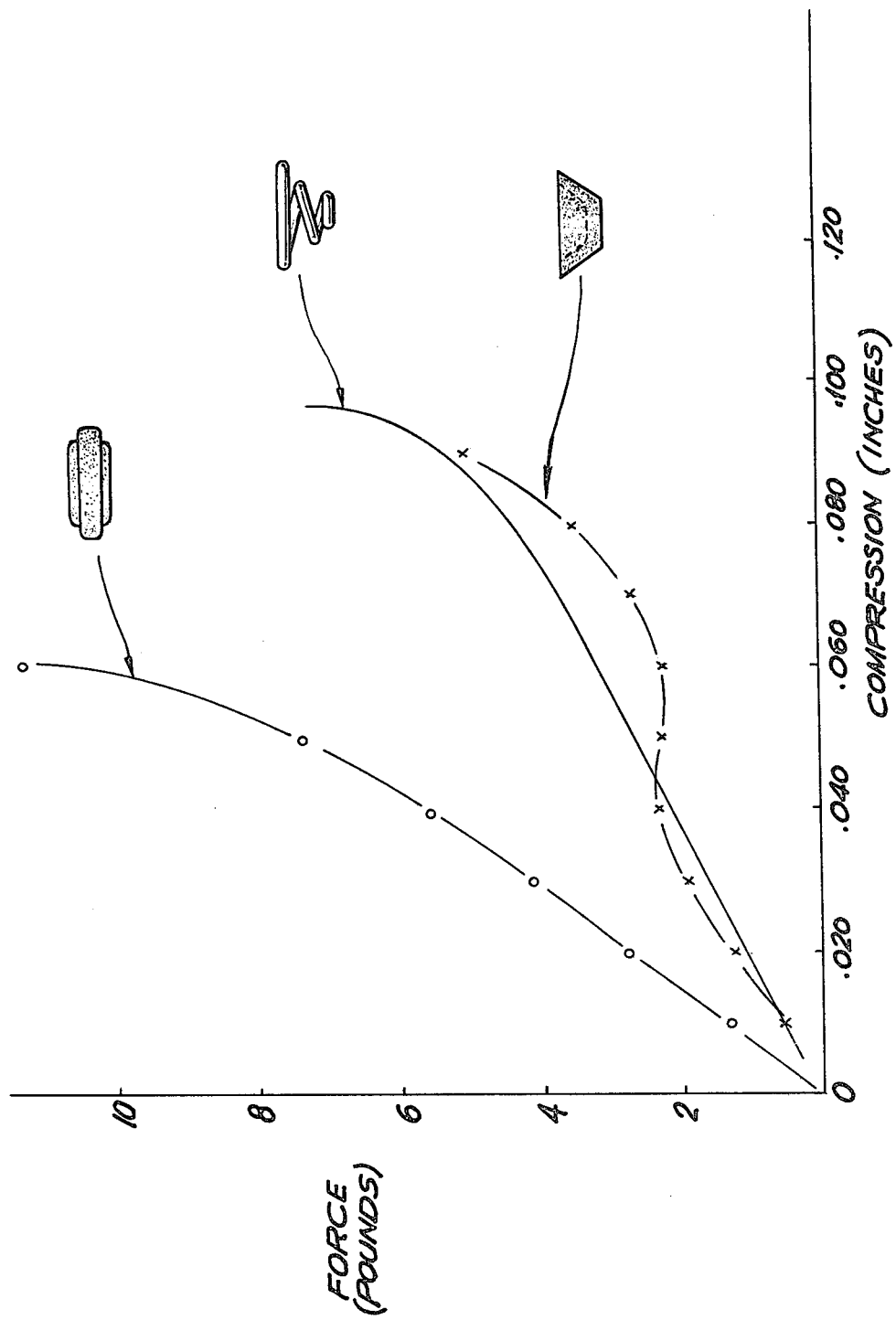
FIG. 8 are stress-strain curves of a typical helical spring used in conventional pressure relief valves of energy cells and of elastomeric members used in the vent devices of the present invention as illustrated in FIGS. 1 and 5.

FIG. 8 illustrates stress-strain curves of compressed elastomeric members as used in the vent device of the present invention compared with a stress-strain curve for a typical helical spring used in the conventional vent devices of energy cells. As shown in FIG. 8, there is a flat region in the stress-strain curve of the truncated cone elastomeric member for applied forces in the range of about 2-3 lbs. while no such flat region exists in stress-strain curve for the helical spring or the elastomeric member of convex shape.

The vent hole(s) in the inner plate should have a diameter of about 0.050-0.090 inch and preferably in the order of 0.060 inch. The elastomeric member should cover the vent hole with a border around the hole of about 0.030-0.050 inch to assure proper sealing of the vent hole. Therefore, a vent hole of 0.060 inch diameter requires an elastomeric member to have a smooth base surface contacting the inner plate of about 0.09-0.11 inch diameter.

The inner and outer metal plates of the vent device can be comprised of any durable metal such as a nickel-plated steel. It must be rigid and flat and have a surface which is compatible for welding or bonding to each other.

The top or cover of the cell must contain the positive terminal which is electrically connected to the positive plate. The outer plate of the vent device may function as the cover of the cell. Optionally, a high hat or electrically conductive button can be welded to the outer surface of the metal plate to form a positive terminal for the cell. The strap or tab connecting to the positive plate can be welded to the bottom surface of the inner plate which is electrically connected to the upper outer plate.

As brought out above, the pressure relief valve of the present invention provides a significant savings in manufacturing costs compared with helical-spring type valves used in conventional energy cells, with no sacrifice in reliability. In addition to manufacturing and assembly costs, the valve of the present invention requires less space in the cell. Cells containing the valve of the present invention can be improved by utilizing the additional space attributed to the more streamline valve.

What is claimed is:

1. A resealable pressure relief valve capable of relieving the excessive build-up of internal pressure within the closed container of an energy cell by venting gas from within the container to the atmosphere and resealing the container after venting, said valve comprising:
   an outer cover plate,
   an inner base plate joined to the outer cover plate, a central cavity being formed therebetween; and
   a compressed, resilient elastomeric member interposed in the cavity between said plates whereby said elastomeric member is positioned to overlie a vent orifice located in the inner base plate, said elastomeric member being compressed to a degree whereby the elastomeric member forms an air-tight seal over the vent orifice when the internal container pressure is less than a predetermined limit, the shape of the elastomeric member being such that greater compression thereof occurs in the central portion directly above the vent orifice and lesser degree of compression occurs in the peripheral portion of the member; whereby said elastomeric member is capable of becoming deformed or distorted with respect to the inner base plate and breaking its seal over the vent orifice when the internal container pressure exceeds a predetermined limit for the container, said break in the seal over the vent orifice in the inner plate forming a passageway for gases to exit from the interior of the container to the atmosphere, and whereby the elastomeric member has sufficient memory to reseal the vent orifice, when the internal pressure of the container falls below the predetermined limit.

2. The valve of claim 1 wherein the elastomeric member is in the shape of a truncated cone interposed in inverted position and overlying the vent orifice in the inner base plate.

3. The valve of claim 1 wherein the elastomeric member has a cylindrical shape with tab-like extensions protruding outward to the periphery.

4. The valve of claim 1 wherein the elastomeric member is convex in shape, having a greater cross-sectional length for the central portion thereof than across the periphery or ends thereof.

5. The valve of claim 1 wherein the resealable vent opens for venting internal gas at an internal pressure in excess of the minimum operating pressure for the energy cell and below the maximum pressure for maintaining the integrity and safety of the cell's container.

6. The valve of claim 1 wherein the elastomeric member is of an ethylene-propylene rubber.

7. The valve of claim 1 wherein the elastomeric member, when positioned in said valve under normal operating conditions, is compressed to a degree whereby its compressed thickness of height is equal to or less than a 20% reduction in the thickness of the uncompressed member.

8. The valve of claim 1 wherein each of the vent holes in said inner plate have a diameter in the range of 0.05–0.09 inches.

9. The valve of claim 1 which is capable of venting gases from within the cell container when an internal pressure of the cell exceeds a predetermined pressure such as 100 psig.

10. In a method for venting a sealed energy cell when the internal pressure of the cell exceeds a predetermined maximum valve, and for resealing the cell after the internal pressure falls below said maximum value, the improvement which comprises incorporating in said energy cell the resealable pressure relief valve of claim 1.

11. A resealable pressure relief valve capable of relieving the excessive build-up of internal pressure within the closed container of an energy cell by ventig gas from within the container to the atmosphere and resealing the container after venting, said valve comprising:
   an outer cover plate;
   an inner base plate joined to the outer cover plate, a central cavity being formed therebetween; and
   a compressed, resilient, elastomeric member interposed in the cavity between said plates whereby said elastomeric member is positioned to overlie a vent orifice located in the inner base plate, said elastomeric member being compressed to a degree whereby the elastomeric member forms an air-tight seal over the vent orifice when the internal container pressure is less than a predetermined limit, the shape of the elastomeric member being such that the stress-strain curve of the compressed elastomeric member with respect to the sealing forces over said vent orifice exhibits a relatively flat region; whereby said elastomeric member is capable of becoming deformed or distorted with respect to the inner base plate and breaking its seal over the vent orifice when the internal container pressure exceeds a predetermined limit for the container, said break in the seal over the vent orifice in the inner plate forming a passageway for gases to exit from the interior of the container to the atmosphere, and whereby the elastomeric member has sufficient memory to reseal the vent orifice, when the internal pressure of the container falls below the predetermined limit.

* * * * *